United States Patent Office 3,135,617
Patented June 2, 1964

3,135,617
CEMENT PLASTER
W. J. Newell, 421 Conner Ave., and James E. Madden, 4709 Calmont St., both of Fort Worth, Tex.
No Drawing. Filed Oct. 6, 1959, Ser. No. 844,627
9 Claims. (Cl. 106—98)

This invention relates to an improved cement plaster. More particularly it relates to cement plasters, having a workability and a plasticity which have been substantially increased by the addition of small but significant amounts of finely divided siliceous material to the basic plaster composition.

One object of the invention is to produce a stronger cement plaster than those heretofore commercially available.

Another object of the invention is to provide a cement plaster formulation which exhibits a low shrinkage and which is therefore less susceptible to checking and crack development and which because of the lower shrinkage permits the successive application of scratch coat, brown coat and finish coat after only a one day set interval for each coat.

Still another object is to provide a cement plaster having greatly enhanced cohesiveness, thereby facilitating the even application of relatively thick coats, on vertical surfaces, without slippage.

Still a further object of the invention is to avoid the use of lime as an addition to plasters, by the use in critical amounts, of a specific type of siliceous material, whereby the benefits associated with lime additions, namely: increased workability, fattening and high early strength are obtained without any of the disadvantages inherent in the use of lime additions, e.g. the possibility of lime burns to the mechanic.

Still a further object is to provide a cement plaster free from bleed-through and which is therefore suitable for painting in two days or less after it is applied.

Still another object is to provide a cement plaster containing an exceedingly finely divided silica which can be stored dry for indefinitely long intervals without experiencing any loss in effectiveness.

Finally it is an object of the present invention to provide a material which can be successfully applied by the mechanic or plasterer with greater ease and with more uniform results than the plasters heretofore known.

These and other objects are achieved by the incorporation of an exceedingly finely divided silica having a particle size up to about 40 millimicrons and preferably consisting predominantly of particles up to about 20 millimicrons. Additions of such silica in amounts as little as between ¼% and ½% by weight of the cement in the plaster composition greatly improve cohesiveness, workability, plasticity and set up time of the cement plaster and either completely eliminate the need for adding lime or greatly reduce the amount of lime, which would normally be required. Amounts of the silica up to about 1% are generally completely adequate for our purpose. More can be added, e.g. up to about 2%, but this generally does not provide sufficient additional improvement to make it economically worthwhile.

We have found particularly suitable for our purpose silica produced by the vapor phase hydrolysis of $SiCl_4$ at a temperature below the sublimation temperature of silica so that the silica product is formed in solid phase. Such a product can be obtained by the hydrolysis of $SiCl_4$ vapor in a hydrogen-oxygen flame.

The siliceous product which it is preferred to use in the cement plasters of the present invention is a solid produced by reacting $SiCl_4$, hydrogen and oxygen in the vapor phase, to yield HCl and a solid silica product: a colloidal silica, having a particle size range of between about 0.015 and 0.020 micron, a silica content on a moisture-free basis of between 99.0% and 99.7% and a high external surface area on the order of 175–200 sq. meters per gram. The silica recovered from the process is purged of acid and when dispersed in water, after purification, the silica has a pH of between about 3.5 and 4.2. It is to be noted that such a silica is radically different in behavior from silicas obtained as solids by condensation from a silica vapor phase e.g. as described in Sharp Patent 2,410,954.

Other finely divided silica solids may be used provided they have properties which are generally similar to and equivalent to those set forth above. For instance, the silica could be obtained by decomposition of a silicoalkide and as $SiHCl_3$, or a hydride such as $SiH_4$ or a halide such as $SiCl_4$, or other suitable silicon compound. These could include the synthetic product sold under the trade name DC Silica, or the product Cab-O-Sil, the production of which is described in Industrial and Engineering Chemistry, vol. 51, pages 232–238, published March 1959.

The invention will be more fully understood from a consideration of the following description in which a number of specific formulations are given by way of example, but these are not to be considered as limitative of the invention.

*Prior Art*

A vertical wall was plastered by applying a plaster to an expanded metal lath in the following manner. To the bare metal lath there was first applied a "scratch coat" of the following composition:

| Material | Parts by volume, sacks | Parts by weight, pounds |
|---|---|---|
| Portland Cement | 1 | 100 |
| Sand | 2 | 200 |
| Lime | ½ | 25–50 |

After the coating had cured for between 2 and 3 days there was next applied a "brown coat" of the following composition:

| Material | By volume | By weight |
|---|---|---|
| Portland Cement | 1 | 100 |
| Sand | 3 | 300 |
| Lime | ½–1 | 25–50 |

This coating was cured for 3 to 4 days, wetting it down to dissipate the heat produced by reactions between the lime and the mix.

Thereafter a "finish coat" was applied having a composition similar to the brown coat and consisting of Portland cement, fine screened sand and tending to be slightly higher in lime, than the previously applied base coats. Even with an experienced workman, it required considerable skill to trowel the coating to a smooth finish.

*Present Invention*

Corresponding cement plasters formulated in accordance with a preferred embodiment of the present invention consisted of the following lime-free mixes:

|  | Scratch Coat | | Brown Coat | | Finish Coat | |
| --- | --- | --- | --- | --- | --- | --- |
|  | By Vol. | By Wt. | By Vol. | By Wt. | By Vol. | By Wt. |
| Portland Cement | 1 | 100 | 1 | 100 | 1 | 100 |
| Clean Sand | 2 | 200 | 3 | 300 | 2-3 | 200-300 |

Plus ¼# of finely divided silica added to each mix per bag (100#) of Portland cement.

The workability and plasticity of the resulting plasters was noticeably superior to those of the prior art cement plasters in which lime was incorporated, as described above, and in addition a considerable speeding up of the plastering operation was also obtained. Thus with the Portland cement-sand-lime plasters identified above as "prior art," a plastering schedule along the following lines was required: Apply scratch coat, wait at least three days, then apply brown coat, wait for about 3 days, then apply finish coat, wait for another 3 days before painting to avoid bleedthrough. With the improved plasters of the present invention, the interval after applying the scratch coat may be diminished to only 1 day, the plaster then being in condition to be wet down for application of the brown coat. Again only one day need be allowed before wetting down and applying the finish coat and in another day, this may be painted without experiencing any bleeding.

While we do not wish to be bound by any specific theory, we believe that silica produced in the manner described, above and which has never been condensed from a silica vapor, has surface characteristics and an absence of internal porosity which appear to markedly improve the workability of plasters in which it is incorporated, it being noted that the addition of as little as ¼% by weight produces this improved workability.

By use of this invention thicknesses of up to between 6 and 8 inches of cement plaster may be applied to vertical surfaces.

We claim:

1. A Portland cement composition containing colloidal silica obtained by vapor phase hydrolysis of a hydrolyzable silicon compound at a temperature below the vaporization temperature of silica, said colloidal silica comprising about ¼% to about 2% by weight of the Portland cement.

2. The Portland cement composition of claim 1 in which the hydrolyzable silicon compound is $SiCl_4$.

3. The Portland cement composition of claim 1 which contains sand filler.

4. The Portland cement composition of claim 2 which contains sand filler.

5. The Portland cement composition of claim 1 in which the colloidal silica comprises about ¼% to about 1% by weight.

6. The Portland cement composition of claim 2 in which the colloidal silica comprises about ¼% to about 1% by weight.

7. The Portland cement composition of claim 3 in which the colloidal silica comprises about ¼% to about 1% by weight.

8. The Portland cement composition of claim 4 in which the colloidal silica comprises about ¼% to 1% by weight.

9. A portland cement plaster composition containing colloidal amorphous silica, obtained by vapor phase hydrolysis of a hydrolyzable silicon compound at a temperature below the vaporization temperature of silica, said colloidal silica having a particle size between about .015 to about .025 micron and comprising about ¼% to 2% by weight of the Portland cement.

References Cited in the file of this patent

UNITED STATES PATENTS

| 1,959,748 | Sevendsen | May 22, 1934 |
| 2,466,145 | Austin et al. | Apr. 5, 1949 |
| 2,805,719 | Anderson | Sept. 10, 1957 |
| 2,901,368 | Newell | Aug. 25, 1959 |

OTHER REFERENCES

Mudd et al.: Industrial Mineralist Rocks (1949), pub., N.Y.C., by Am. Inst. Mining and Met. Engineers (page 307).

Condensed Chemical Dictionary, 4th Ed. (1950), pub., N.Y.C., Reinhold (page 220).

Ind. Eng. Chem., vol. 51, pp. 232–238, March 1959.